United States Patent [19]

Lundell

[11] Patent Number: 5,024,335
[45] Date of Patent: Jun. 18, 1991

[54] AUTOMATIC SORTER

[76] Inventor: Vernon J. Lundell, Box 171, Cherokee, Iowa 51012

[21] Appl. No.: 278,329

[22] Filed: Nov. 30, 1988

[51] Int. Cl.$^5$ .......................... B07B 13/05; B07C 5/00
[52] U.S. Cl. .................................... 209/618; 209/615; 209/629; 209/669; 209/930
[58] Field of Search .............. 209/617, 618, 615, 629, 209/654, 669, 667, 642, 673, 642, 930, 630–635, 606, 658; 171/18, 58, 133, 28

[56] References Cited

U.S. PATENT DOCUMENTS

| | | | |
|---|---|---|---|
| 2,114,263 | 4/1938 | Heaslet | 209/642 X |
| 2,119,919 | 6/1938 | Knight et al. | 209/669 |
| 2,786,574 | 3/1957 | Clark | 209/669 X |
| 3,217,346 | 11/1965 | Silver et al. | 209/669 X |
| 4,120,363 | 10/1978 | Ernst | 209/669 X |
| 4,224,350 | 9/1980 | Merck | 209/654 X |
| 4,471,876 | 9/1984 | Stevenson et al. | 209/618 |
| 4,700,925 | 8/1988 | Stehle et al. | 209/930 X |

Primary Examiner—Donald T. Hajec
Attorney, Agent, or Firm—Fleit, Jacobson, Cohn, Price, Holman & Stern

[57] ABSTRACT

A sorter for separating waste material such as aluminum cans, large plastic containers, cardboard containers, cardboard, small lumber or wood material, paper and similar lightweight material by directing the waste material to be sorted downwardly onto pairs of elongated driven rollers which are arranged for gripping and pulling paper and similar material downwardly between adjacent rollers of a pair while aluminum cans and large plastic and cardboard containers will move longitudinally on the rollers with the plastic containers being lifted upwardly and discharged onto a conveyor and the cans being discharged from the ends of the rollers. The rollers have a spiral rib thereon to facilitate gripping of paper material and movement of the aluminum cans and containers. A kicker, in the form of a rotatable brush, is oriented above the discharge end of the rollers for lifting large lightweight material such as large containers upwardly along the interior of a curved deflector onto a conveyor.

13 Claims, 4 Drawing Sheets

AUTOMATIC SORTER

BACKGROUND OF THE INVENTION

FIELD OF THE INVENTION

The present invention generally relates to a sorter for separating waste material such as aluminum cans, large plastic containers, cardboard containers, cardboard, small lumber or wood material, paper and similar lightweight material by directing the waste material to be sorted downwardly onto pairs of elongated driven rollers which are arranged for gripping and pulling paper and similar material downwardly between adjacent rollers of a pair while aluminum cans and large plastic and cardboard containers will move longitudinally on the rollers with the plastic containers being lifted upwardly and discharged onto a conveyor and the cans being discharged from the ends of the rollers. The rollers have a spiral rib thereon to facilitate gripping of paper material and movement of the aluminum cans and containers. A kicker, in the form of a rotatable brush, is oriented above the discharge end of the rollers for lifting large lightweight material such as large containers upwardly along the interior of a curved deflector onto a conveyor.

INFORMATION DISCLOSURE STATEMENT

Present day efforts to recycle solid waste material include systems in which collected solid waste material is separated into various categories. A magnetic separator has been provided for separating ferrous materials from the solid waste. Glass and other heavier fractions of waste material are also separated from lighter weight paper, plastic and the like by utilizing various techniques. The paper or burnable material can be used as a source of fuel and such material can be compacted into pellet form to facilitate its use as a fuel. One problem which has persisted in various recycling systems is the separation of aluminum beverage cans and large plastic containers from the other solid waste material since these cans and containers are not subject to magnetic attraction and, due to their lightweight, aluminum cans and large plastic containers will remain combined with paper rather than being separated with the heavy fractions. It has been the usual practice for a person, known as a picker, to be stationed along the conveying path of the material to be recycled in order to manually pick out and remove aluminum cans and large plastic containers from the burnable paper and other burnable materials so that the aluminum cans and large plastic containers can be recycled or properly disposed of and the paper used as a fuel. Some efforts have been made to utilize rather complex devices utilizing eddy currents and the like to separate aluminum cans but such devices have not performed adequately, especially when the volume of solid waste material is relatively heavy. The prior art does not include a mechanical separator or sorter which will separate aluminum cans and large plastic containers from paper, cardboard or similar lightweight, flexible, thin, panel-like material.

SUMMARY OF THE INVENTION

An object of the present invention is to provide a mechanical, automatic sorter which will efficiently separate aluminum cans, such as aluminum beverage cans, and large plastic or cardboard containers, such as milk or beverage containers, from paper or similar solid waste material with the sorter being incorporated into a recycling system where the solid waste material has been previously passed through several separating stations.

Another object of the invention is to provide a sorter which includes a plurality of pairs of rollers oriented at different levels with each roller being provided with a spiral rib thereon and arranged in sufficiently close proximity that adjacent rollers which are being driven in opposite directions will grip and pull paper, cardboard and the like downwardly through the rollers for discharge of the paper or similar material, thus leaving lightweight, generally cylindrical aluminum beverage cans and large plastic or cardboard containers on the top surface of the rollers with the spiral rib conveying the cans and containers longitudinally of the rollers for discharge from the sorter at an end of the rollers remote from the end of the rollers on which the combined paper material and aluminum cans are deposited.

A further object of the invention is to provide a sorter in accordance with the preceding objects in which at least the upper rollers are spring supported to enable passage of larger material such as heavy cardboard and other similar material including wood components such as 2"×4" wood components or lumber which has relatively sharp corner edges to enable it to be gripped by the ribs on the rollers. Cylindrical members such as aluminum beverage cans and large plastic or cardboard containers will not be gripped by the ribs and will remain on the top surface of the rollers for movement longitudinally thereon.

Yet another object of the invention is to provide a sorter in accordance with the preceding objects which includes a transversely extending driven kicker positioned above the rollers and including radially extending bristle brush arrangements to kick or lift large items such as large, hard plastic or cardboard containers used in packaging milk, juices and beverages from a point adjacent the discharge end of the rollers upwardly along the inner surface of a deflector plate and over the brush onto a conveyor. In one embodiment, a driven shaft with fingers thereon assists in lifting the containers from the rollers. The brushes are spaced above the rollers sufficiently to enable beverage cans to pass under the kicker but not sufficient to enable passage of large paper, cardboard or plastic items.

A still further object of the invention is to provide a sorter in accordance with the preceding objects in which the rotational driving movement of the rollers is through a single drive chain with the spring loaded rollers being movable without changing tension on the chain and with the top rollers working together to pull paper through and between rollers with the rotational direction also causing paper to move laterally or transversely of the rotational axes of the rollers for more efficient movement of the paper downwardly between the rollers for separating the paper and similar material from the aluminum beverage cans and large lightweight plastic or cardboard containers.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
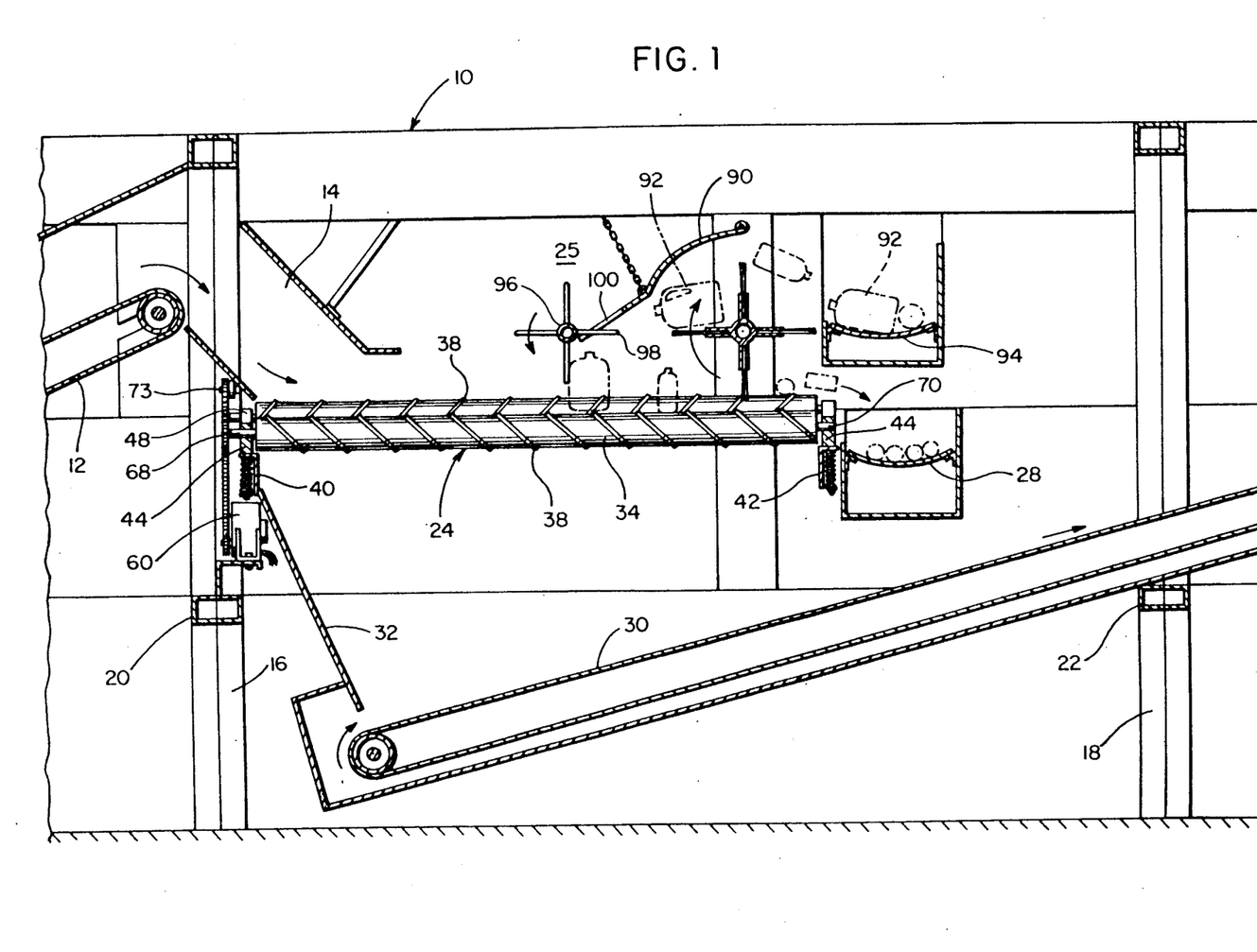
FIG. 1 is a longitudinal, sectional view of the automatic waste sorter of the present invention.
Figure 2:
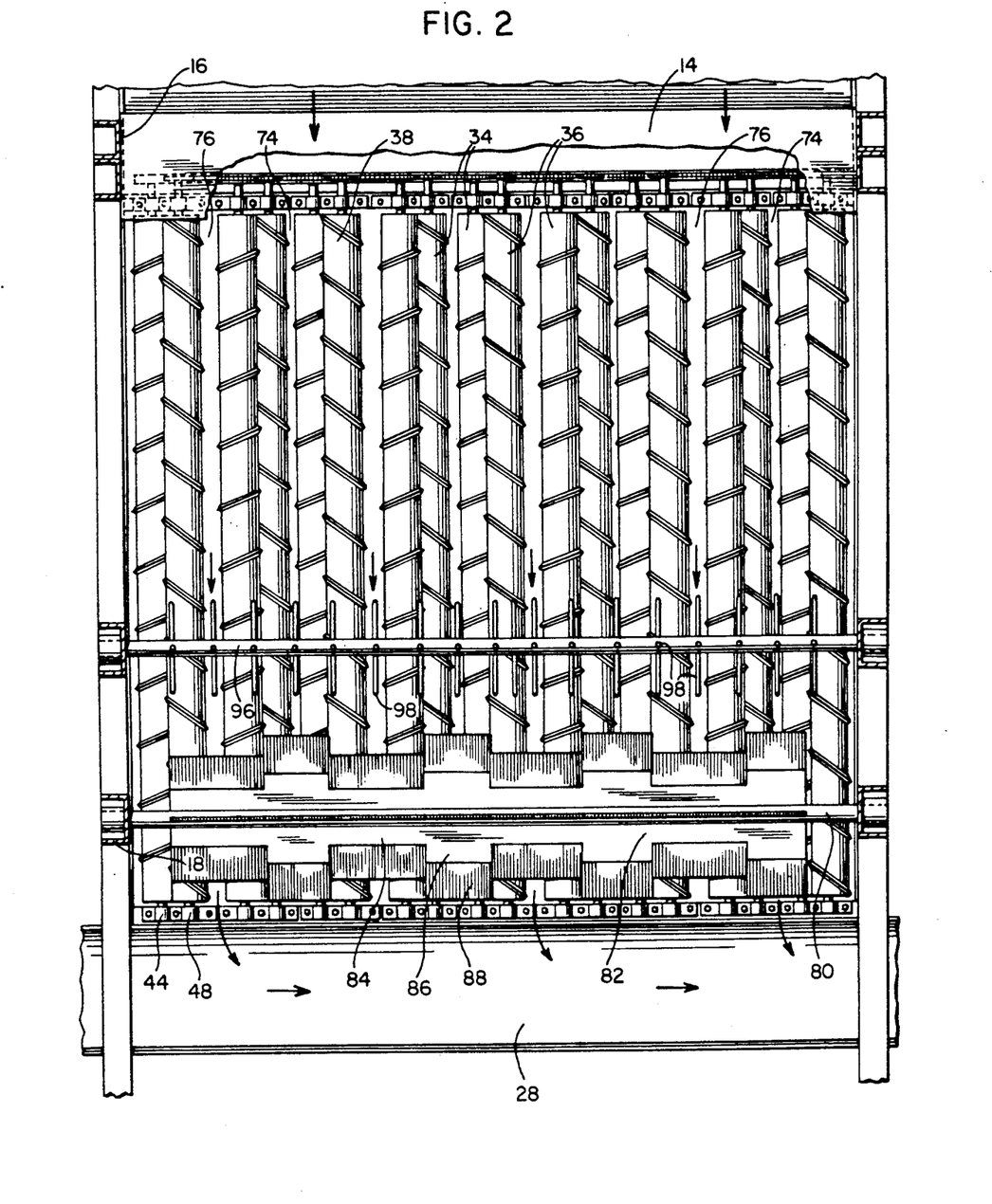
FIG. 2 is a top plan view of the sorter.
Figure 3:
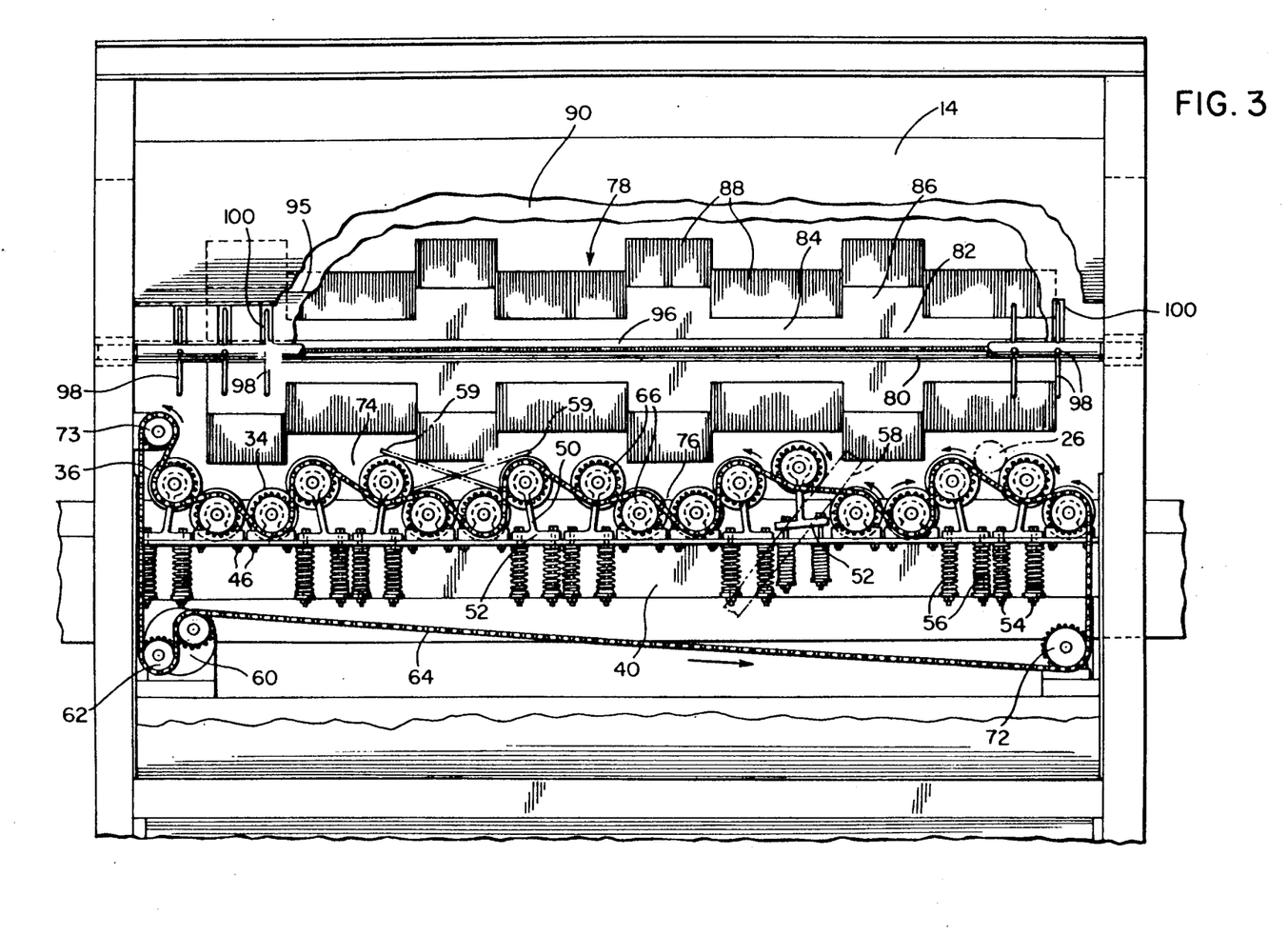
FIG. 3 is a transverse, sectional view of the sorter illustrating the association of the rollers, kicker, lifting fingers and deflector plate.

Referring now specifically to FIGS. 1-3 of the drawings, the automatic sorter of the present invention is generally designated by the reference numeral 10 and is illustrated in a recycling system which includes a feed or supply conveyor 12 for discharging previously separated solid waste material into an entrance chute 14 which is downwardly inclined. The material fed into the separator through the entrance chute 14 includes paper, containers of cardboard or plastic material and aluminum beverage cans with the paper including various types, shapes and sizes of paper, cardboard or similar materials such as normally found in solid waste collected from various sources.

The sorter 10 includes vertical supporting framework members 16 and 18 of conventional construction with transverse support members 20 and 2 being provided between the vertical support frame members 16 and 18. The specific structural details of the supporting framework may vary depending upon the installational requirements.

A sorting and conveying structure is generally designated by reference numeral 24 which receives the solid waste material from the chute 14 and discharges aluminum beverage cans 26 at the opposite end thereof onto an offbearing conveying structure 28. Paper material is pulled downwardly through the sorter 24 and is discharged onto an offbearing conveyor 30 that extends from an inclined end wall 32 and provided with side walls of conventional construction in order to convey the paper material to the next station in the recycling system so that the burnable paper material may be converted into a fuel by pelletizing. Large plastic containers 92 are lifted from the sorter and discharged onto a conveyer 94.

The sorting and conveying structure 24 includes a plurality of elongated, cylindrical lower rollers 34 and similar upper rollers 36 with each of the rollers including a spiral rib 38 on the exterior surface thereof which extends from end-to-end of the rollers with the spiral arrangement on adjacent rollers being oppositely spiraled as illustrated in FIG. 2.

The rollers 34 and 36 are supported from transversely extending support frames or beams 40 and 42 with the lower rollers 34 being journaled in bearing blocks or trunnions 44 which are rigidly affixed to the support members 40 and 42 by fastening bolts 46 or the like. The upper rollers 36 are supported by similar bearing blocks or trunnions 48 which include an elongated angled support member 50 having a base 52 that engages the respective support beams 40 or 42 and is secured thereto by spaced bolts 54 having a coil compression spring 56 mounted thereon which enables upward and limited pivotal movement of the upper rollers 36. This enables the upper roller 36 to move by compressing the springs 56 so that the base 52 can move upwardly and pivot slightly as illustrated in FIG. 3 so that a large piece of wood such as a 2"×4" 58 can pass between the upwardly moved upper roller 36 and an adjacent lower roller 34. The ribs 38 on adjacent rollers will effectively grip the rectangular or square cross sectional area of &:he wood component or similar item and move it downwardly between the rollers for discharge onto the conveyor 30.

All of the rollers 34 and 36 are driven by a single motor 60 which may be an electric motor, hydraulic motor or any other type of motor having an orbit drive or other type of drive gear arrangement 62 which drives a single roller or sprocket chain 64 located at the ends of the rollers 34 and 36 which underlie the chute 14 with each of the rollers 34 and 36 including a sprocket or roller chain gear 66 mounted on the end thereof and connected to stub shafts 68 on the rollers 34 and 36. As illustrated in FIG. 1, the rollers 34 and 36 include a stub shaft 70 at the discharge end thereof received in the bearing blocks supported from the frame member 42 with the upper surface of the upper rollers 36 being sufficiently elevated to enable the cans 26 to pass over the bearing blocks onto the conveyor 28.

The orientation and rotational direction of the rollers is significant. As illustrated in FIG. 3, the chain 64 as it leaves the motor 60 is entrained under an idler gear 72 and then extends over a gear 66 on a lower roller 34 and then under a gear on an adjacent upper roller 36 and then over a gear on an adjacent upper roller 36 and then downwardly under a gear on an adjcacent lower roller 34 and then over a gear on an adjacent lower roller 34 with this pattern being repeated with each set of rollers which includes two lower rollers 34 which are rotatable in opposite directions but are stationarily supported and two upper rollers 36 which are rotatable in opposite directions to each other and to the adjacent lower rollers and movable as permitted by the springs 56 as illustrated in FIG. 3. This not only permits large items 58 to be moved downwardly between the rollers but also paper panels or components 59 as illustrated in FIG. 3 to be moved downwardly. The rotational movement of the rollers is such that paper material and larger components within certain limits having sharp corners and flat surfaces can be moved between adjacent bottom and top rollers. The adjacent top rollers are spaced apart to form a cradle 74 having a width less than the diameter of an aluminum beverage can 26 as illustrated in FIG. 3. The spiral ribs on adjacent upper rollers which form the space or cradle 74 are spiraled in opposite directions so that beverage cans 26 which come to rest in the cradle space will be moved longitudinally of the rollers as indicated by the arrows in FIG. 2 and discharged off the discharge end of the rollers into the conveyor 28. Likewise, the closely adjacent lower rollers 34 form a narrow cradle 76 which will also serve to move the beverage cans longitudinally of the rollers for discharge onto the conveyor 28.

As the mixed paper, large plastic or cardboard containers and aluminum cans enter the sorter 24 from the chute 14, the material is directed downwardly onto the rollers. The paper material and similar thin, flexible material will be gripped by the adjacent top and bottom rollers and pulled downwardly between the rollers and discharged by gravity onto the conveyor 30 for conveying to a subsequent recycling station. The aluminum beverage cans will be oriented lengthwise of the rollers due to contact of the spiral ribs therewith and come to rest in a cradle 74 or 76 so that the spiral ribs which are oppositely spiraled and which are turning in opposite directions will move the aluminum cans longitudinally along the cradle 74 or 76 and cause them to drop off the ends of the rollers onto the conveyor 28.

A kicker brush 78 is supported transversely of and above the rollers 34 and 36 as illustrated in FIG. 1. The kicker brush 78 includes a shaft 80 supported in suitable bearing structures and driven from a suitable drive structure such as a connection with the conveyor 30, the conveyor 28 or the motor 60. The shaft 80 includes four circumferentially spaced, radially extending brush mounting assemblies 82 which includes a mounting portion 84 having a relatively short radial length and a mounting portion 86 having a relatively long radial length with each mounting portion including brush bristles 88 of equal length secured thereto thus forming a brush structure that has different longitudinal portions of different radial length as illustrated in FIG. 3 with the mounting portions 84 and the bristles attached thereto being longitudinally longer than the mounting portions 86 and the bristles 88 attached thereto with the mounting portion 84 which is longer in longitudinal length being aligned with a pair of adjacent upper rollers 36 and the mounting portion 86 which is shorter in longitudinal length being aligned with a pair of lower rollers 34 so that the brush assembly, in effect, is contoured to fit the contour of the upwardly facing surface defined by the rollers 34 and 36 as illustrated in FIG. 3. Also, as illustrated, the brush bristles 88 are spaced above the respective pairs of rollers sufficiently to enable a beverage can 26 to pass under the kicker but larger objects such as cardboard boxes, plastic containers 92 and other vertically enlarged items that are provided with sufficient height to be engaged by the brush will be kicked back toward the chute 14. Located in spaced relation to the kicker brush 78 is a driven rotatable shaft 96 having a plurality of longitudinally spaced sets of lifting fingers 98 thereon with the fingers 98 in each set being circumferentially spaced around the shaft 96 in right angular relation. The fingers 98 will engage large plastic containers and, in some instances, the fingers will penetrate the containers 92. The shaft 96 is driven in the same manner as shaft 80 but in the opposite direction and assists the brush 78 in lifting the large plastic containers into engagement with the inner surface of an arcuate deflector plate 90 which extends partially over the top of the brush 78 and guides the large plastic containers, cardboard containers or the like 92 over the brush 78 onto a transverse conveyor 94 positioned above conveyor 28 for conveying the large items to the next recycling stage. The deflector plate 90 is slotted to permit passage of the fingers 98 and the terminal edge 100 of the deflector plate 90 is positioned adjacent the lower surface of the shaft 96 to strip containers from the fingers 98. The rotatable fingers 98 will assure that the plastic bottles 92, jugs and the like will be carried toward the spinning brush paddles and along the curved surface of plate 90 in order to carry the plastic bottles 92 over the brush 78 onto the conveyor 94. The surface of the deflector plate 90 which engages plastic bottles and other items is curved to guide the items onto conveyor 94.

The sorting and conveying structure 24 includes side walls 25 to contain the material on the upper surface of the rollers 34 and 36 and the conveyor 30 may extend completely across the area below the rollers 34 and 36 or inwardly slanted chute forming walls may be utilized thus enabling a conveyor belt 30 to be used that is of less width than the width of the rollers. While dimensional characteristics may vary, the rollers are preferably at least 4' in length and a workable embodiment includes rollers having a 4" external diameter with the rib formed by a $\frac{1}{4}$" rod welded spirally on the rollers with a 4" lead. While the rollers have been shown at two levels, it is possible that multiple level arrangement of rollers may be provided and, if desired, additional rollers or all of the rollers may be spring supported for limited relative movement. The spring support arrangement for the top rollers 36 enables them to move within certain limits which is sufficient to permit a 2"×4" or the like to pass therebetween but the rollers will not grab or grip the cylindrical, curved, external surfaces of a beverage can. The rotational movement of the rollers and the multi-level arrangement of the rollers will tend to align the longitudinal axis of beverage cans with the rotational axes of the rollers and ultimately orient the cans in the cradles between adjacent rollers. The ribs on the rollers will not grip cylindrical surfaces on a beverage can or the like but will effectively grip thin panels such as panels oriented as indicated by reference numeral 59 in FIG. 3 so that such panels or other paper material including wood components 58 will pass downwardly between adjacent upper and lower rollers which are turning in opposite directions with the adjacent surfaces moving downwardly to move the material between adjacent upper and lower rollers. Adjacent upper rollers are rotating so their adjacent surfaces are moving upwardly and the adjacent lower rollers are rotating so their adjacent surfaces are moving upwardly so the entrance area for the paper material is between adjacent upper and lower rollers with at least the upper roller being resiliently mounted for movement in relation to the adjacent lower roller with the structure of the supporting arrangement for the movable upper roller being such that the tilting and upward movement will not increase tension on the single drive chain which could cause binding of the chain. The idler gear 72 may be constructed so that it can be adjusted to vary tension on the drive chain and may be resiliently movably mounted to maintain a desired tension on the single drive chain 64 which, as illustrated in FIG. 3 moves over a second idler gear 73 in the manner indicated by the arrows. The rotational direction of the rollers, particularly the upper rollers, will cause the paper material to move transversely or laterally of the upper rollers and become oriented with a free edge thereof downwardly inclined for movement between the adjacent upper and lower rollers as illustrated by reference numeral 59 in FIG. 3.

The kicker brush which is mounted crosswise at the discharge end of the rollers includes four radial bristle brush arrangements having portions at different heights so that clearance is provided for beverage cans but not for large paper, cardboard containers, plastic containers 92 or the like. This structure effectively separates large containers such as one-gallon plastic containers, one-half gallon plastic containers and similar containers in which milk, fruit juices and beverages are packaged for distribution. Other containers such as plastic coated cardboard containers, plastic containers for liquid and granular soaps and detergents and the like are also separated from the paper and cans thereby increasing the capacity and efficiency of the sorter. The kicker brush is driven relatively slowly and is driven from the conveyor 30 or the conveyor 28 by any suitable type of drive belt or chain arrangement. The fingers 98 cooperate with the rollers to move large containers toward the brush 78 and cooperate with the brush 78 and deflector plate 90 to assist in lifting the large containers onto conveyor 94 with the slotted edge 100 of the deflector plate stripping any impaled containers from the rigid containers.

Figure 4:
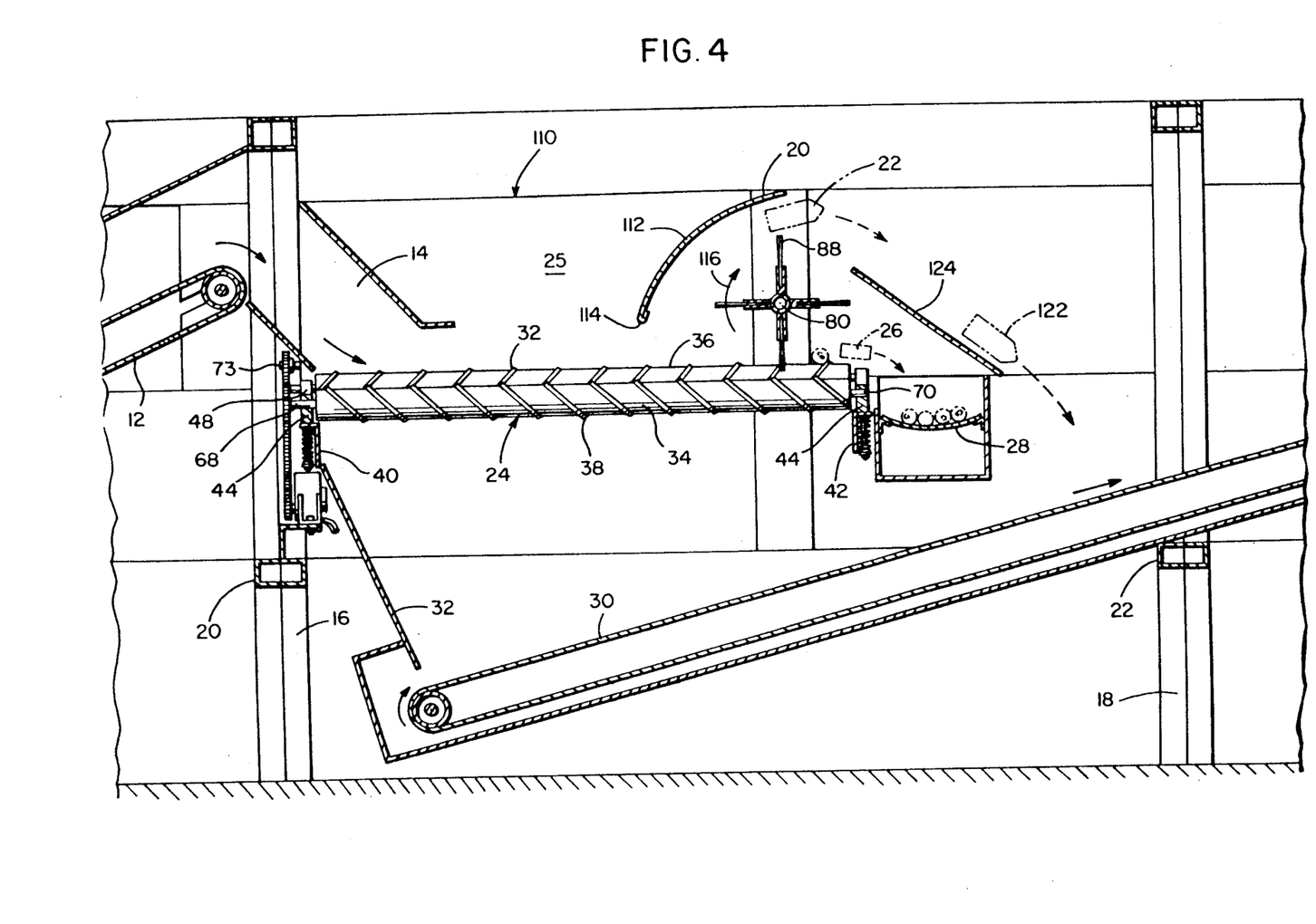
FIG. 4 is a sectional view similar to FIG. 1 illustrating a modified form of the sorter.

FIG. 4 illustrates a modified embodiment of the sorter that is generally designated by reference numeral 110 and includes the same components insofar as the sorting and conveying structure is concerned including the ribbed rollers, conveyors 28 and 30 and kicker brush 78 with identical components utilizing the same reference numerals as in FIGS. 1-3. In this embodiment of the invention, an arcuate shield 112 is mounted transversely above the rollers 34 and 36 and the kicker brush 78 with the shield o guide 112 being generally concentric with the periphery of the kicker brush 78. The shield 112 is supported from the framework 18 in spaced relation to the periphery of the brush bristles 88 and the lower edge 114 of the shield is spaced above the rollers 34 and 36 a sufficient distance to enable large cardboard containers or other large pieces of cardboard or other waste material to pass under the bottom edge 114 of the shield I!2 with the space between the shield 112 and brush 78 enabling these larger containers or larger components of cardboard or other material to be moved forwardly and upwardly as indicated by the directional arrow 116 in FIG. 4. The upper edge of the shield 112 designated by numeral 120 is positioned above the uppermost path of movement of the brush bristles 88 so that large material picked up by the brush 78 will be guided in an upward arcuate path along the inner surface of the arcuate shield 112 and discharged rearwardly from the rotatably driven brush 78. The waste material 122 such as a cardboard container is discharged in a rearward trajectory by rotational movement of the brush 78 and the guide surface formed by the shield 112 with the material 122 then being guided by a downwardly inclined guide member 124 in the form of an enlarged plate-like panel having its lower edge extending to or beyond the upper edge of the conveyor structure 28 as illustrated in FIG. 4 and its upper and forward edge being disposed close to but slightly outwardly of the path of the outer edges of the bristles 88 as they rotate. The waste material such as cardboard containers and the like are discharged onto the upper surface of the guide member 124 with the angle of inclination of the guide member 124 being such that gravity will cause the waste material to slide downwardly and off the edge thereof and fall vertically onto the conveyor 30 which is carrying paper material discharged downwardly through the rollers 34 and 36 so that this waste material will go to the next step in the recycling system. As illustrated, the guide member 124 is positioned with its forward edge above the center of rotation of the brush 78 and sufficiently above the conveyor 28 to enable free passage of aluminum cans 26 onto the conveyor 28.

This embodiment of the invention is especially useful when large plastic containers are not included in waste material but cardboard containers that will not be gripped and pulled downwardly through the rollers 34 and 36 are included in the waste material along with other large cardboard components that may not be gripped by the rollers 34 and 36 so that such cardboard material will be discharged onto the conveyor 30 by the coaction of the kicker brush 78, shield or guide 112 and guide member 124. By utilizing alternative and optional structures at the discharge end of the sorting and conveying assembly 24, efficient separation of various materials can be obtained depending upon the characteristics of the waste material entering the sorter. If large plastic containers are in the waste material, the assembly illustrated in FIG. 1 works effectively to separate the plastic containers and maintain them separate for subsequent recycling by use of the specific arrangement illustrated in FIG. 1. If plastic containers are not in the make-up of the waste material, then the simplified arrangement illustrated in FIG. 4 will efficiently handle the waste material to separate the aluminum cans from the various types of paper and cardboard materials.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A sorter for separating generally cylindrical aluminum beverage cans from paper material, items larger than cans and material thicker than paper material comprising a plurality of generally horizontally disposed, parallel, adjacent, cylindrical rollers to form an upwardly facing surface to receive mixed paper material and aluminum beverage cans at one end of the rollers, the other end of said rollers discharging cans therefrom, means rotatably driving said rollers, each of said rollers including a spiral rib on the exterior surface thereof for gripping paper material and moving it downwardly between adjacent rollers, said ribs engaging the external, curved surfaces of the aluminum beverage cans and items larger than cans and moving the cans and larger items toward the discharge ends of the rollers and engaging and moving the beverage cans longitudinally of the rollers and off discharge ends thereof, means conveying the aluminum cans from the discharge ends of the rollers and means conveying the paper material from under the rollers, said rollers including a plurality of adjacent upper rollers supported for rotation about axes oriented generally in the same plane and a plurality of adjacent lower rollers supported for rotation about axes oriented in the same plane disposed below the axes of the upper rollers, said upper rollers being mounted for resilient movement away from a normal position to enable the space between adjacent upper rollers and between the upper rollers and adjacent lower rollers to be enlarged for passage of material thicker than paper material, said means driving the rollers including a single drive chain to drive adjacent rollers in opposite directions with the lower rollers being arranged in pairs and the upper rollers being arranged in pairs between the pairs of lower rollers, each pair of lower rollers including a first lower roller rotating clockwise a second lower roller rotating counterclockwise and forming an upwardly facing trough therebetween with the upwardly facing surfaces of the trough moving upwardly and outwardly, each pair of upper rollers including a first upper roller rotating counterclockwise and a second upper roller rotating clockwise and forming an upwardly facing trough therebetween with the upwardly facing surfaces of the trough moving upwardly and outwardly, said first upper roller of each pair of rollers being disposed adjacent the second lower roller of each pair and forming an upwardly facing trough therebetween with the upwardly facing surfaces forming the trough moving downwardly and inwardly to grip and pull paper material downwardly between adjacent upper and lower rollers.

2. The structure as defined in claim 1 wherein the rotational movement of the upper rollers causes transverse movement of material on the rollers for separation thereof and orientation of paper material in an inclined position for gripping engagement between adjacent upper and lower rollers.

3. The structure as defined in claim 2 together with means adjacent the ends of the rollers from which the aluminum beverage cans are discharged for picking up items larger than cans and discharging them at a point different from the conveying means for the aluminum cans.

4. A sorter for separating generally cylindrical aluminum beverage cans from paper material, items larger than cans and material thicker than paper material comprising a plurality of generally horizontally disposed, parallel, adjacent, cylindrical rollers to form an upwardly facing surface to receive mixed paper material and aluminum beverage cans at one end of the rollers, the other end of said rollers discharging cans therefrom, means rotatably driving said rollers, each of said rollers including a spiral rib on the exterior surface thereof for gripping paper material and moving it downwardly between adjacent rollers, said ribs engaging the external, curved surfaces of the aluminum beverage cans and items larger than cans and moving the cans and larger items toward the discharge ends of the rollers and engaging and moving the beverage cans longitudinally of the rollers and off discharge ends thereof, means conveying the aluminum cans from the discharge ends of the rollers and means conveying the paper material from under the rollers, said rollers including a plurality of adjacent upper rollers supported for rotation about axes oriented generally in the same plane and a plurality of adjacent lower rollers supported for rotation about axes oriented in the same plane disposed below the axes of the upper rollers, said upper rollers being mounted for resilient movement away from a normal position to enable the space between adjacent upper rollers and between the upper rollers and adjacent lower rollers to be enlarged for passage of material thicker than paper material, and a kicker brush adjacent the discharge ends of the rollers with the kicker brush being spaced above the rollers to enable aluminum cans to pass under the kicker brush, said kicker brush engaging items larger than cans to move them upwardly and back toward the other ends of the rollers, an arcuately curved deflector plate receiving the items and guiding them over the top of the kicker brush onto a conveyor and rotatable fingers overlying the rollers in spaced relation to the brush to engage the items to assist in moving such items toward the brush.

5. The structure as defined in claim 4 wherein said kicker brush includes an elongated shaft supported in overlying spaced relation to the rollers, said shaft including a plurality of radially extending support members with each support member including an elongated bristle brush rigid therewith.

6. The structure as defined in claim 5 wherein each bristle brush includes radial portions at different distances from the rotational axis to form a contoured brush arrangement conforming with the general contour of the upwardly facing surface formed by the upper and lower rollers so that the bristle brushes are spaced equally above the rollers throughout the length of the brushes.

7. The structure as defined in claim 6 wherein said means driving the rollers includes a single drive chain to drive adjacent rollers in opposite directions with the lower rollers being arranged in pairs and the upper rollers being arranged in pairs between the pairs of lower rollers, each pair of lower rollers including a first lower roller rotating clockwise and a second lower roller rotating counterclockwise and forming an upwardly facing trough therebetween with the upwardly facing surfaces of the trough moving upwardly and outwardly, each pair of upper rollers including a first upper roller rotating counterclockwise and a second upper roller rotating clockwise and forming an upwardly facing trough therebetween with the upwardly facing surfaces of the trough moving upwardly and outwardly, said first upper roller of each pair of rollers being disposed adjacent the second lower roller of each pair and forming an upwardly facing trough therebetween with the upwardly facing surfaces forming the trough moving downwardly and inwardly to grip and pull paper material downwardly between adjacent upper and lower rollers, the rotational movement of the upper rollers causing transverse movement of material on the rollers for separation thereof and orientation of paper material in an inclined position for gripping engagement between adjacent upper and lower rollers.

8. The structure as defined in claim 4 wherein said fingers rotate in a direction opposite the brush to assist in lifting items larger than cans into engagement with the deflector plate.

9. The structure as defined in claim 8 wherein said deflector plate has a slotted edge disposed adjacent the axis of rotation of the fingers for stripping items impaled on the fingers as such items are lifted upwardly into engagement with the deflector plate.

10. A sorter for separating generally cylindrical aluminum beverage cans from paper material, items larger than cans and material thicker than paper material comprising a plurality of generally horizontally disposed, parallel, adjacent, cylindrical rollers to form an upwardly facing surface to receive mixed paper material and aluminum beverage cans at one end of the rollers, the other end of said rollers discharging cans therefrom, means rotatably driving said rollers, each of said rollers including a spiral rib on the exterior surface thereof for gripping paper material and moving it downwardly between adjacent rollers, said ribs engaging the external, curved surfaces of the aluminum beverage cans and items larger than cans and moving the cans and larger items toward the discharge ends of the rollers and engaging and moving the beverage cans longitudinally of the rollers and off discharge ends thereof, means conveying the aluminum cans from the discharge ends of the rollers and means conveying the paper material from under the rollers, said rollers including a plurality of adjacent upper rollers supported for rotation about axes oriented generally in the same plane and a plurality of adjacent lower rollers supported for rotation about axes oriented in the same plane disposed below the axes of the upper rollers, said upper rollers being mounted for resilient movement away from a normal position to enable the space between adjacent upper rollers and between the upper rollers and adjacent lower rollers to be enlarged for passage of material thicker than paper material, and means adjacent the ends of the rollers from which the aluminum beverage cans are discharged for picking up items larger than cans and discharging them at a point different from the conveying means for aluminum cans.

11. The structure as defined in claim 10 wherein said means for picking up and discharging items includes a kicker brush extending transversely of the discharge end of the rollers and being spaced above the rollers to enable aluminum cans to pass under the kicker brush with the kicker brush engaging the items to move them upwardly and back toward the other end of the rollers and guide means associated with the brush to guide the items upwardly over the brush for discharge and a guide member in the form of an inclined plate overlying the conveying means for the aluminum cans for receiving the items and discharging them by gravity onto the conveying means for the paper where the conveying means exits from under the rollers.

12. A sorter for separating generally cylindrical aluminum cans, paper material, cardboard containers and similar waste material comprising a plurality of horizontally disposed rollers forming a surface receiving waste material at one end thereof, means rotatably driving said rollers with each roller including a rib on the exterior for gripping paper material and moving it downwardly through the rollers with the rotation of the rollers moving aluminum beverage cans longitudinally thereof for discharging the beverage cans off the ends of the rollers and means at the discharge end of the rollers to pick up cardboard containers and discharge the same at a point separate from the point of discharge of the aluminum cans.

13. The structure as defined in claim 12 wherein said means for picking up and discharging cardboard containers includes a rotatable brush having radially extending paddle structures with flexible outer edges oriented transversely of the rollers and spaced above the roller sufficiently to enable aluminum cans to pass under the brush, an arcuate guide member spaced generally concentrically from the brush to engage and guide cardboard containers picked up by the brush to move them over the top of the brush and a generally inclined guide member receiving and discharging them from the upper portion of the brush and arcuate guide member for guiding the discharge thereof.

* * * * *